United States Patent
Karaoguz et al.

(10) Patent No.: US 8,190,161 B2
(45) Date of Patent: May 29, 2012

(54) MULTI-TRANSCEIVER MULTI-PATH COMMUNICATION HANDOFF

(75) Inventors: Jeyhan Karaoguz, Irvine, CA (US); Nambirajan Seshadri, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1031 days.

(21) Appl. No.: 11/092,208

(22) Filed: Mar. 29, 2005

(65) Prior Publication Data

US 2006/0035640 A1    Feb. 16, 2006

Related U.S. Application Data

(60) Provisional application No. 60/601,189, filed on Aug. 13, 2004.

(51) Int. Cl.
*H04W 4/00* (2009.01)
(52) U.S. Cl. ........ 455/437; 455/436; 455/439; 455/442; 370/328; 370/342; 370/350; 370/441; 370/519
(58) Field of Classification Search .................. 455/121, 455/456.1, 436, 437, 439, 442; 370/335, 370/331, 328, 342, 350, 441, 519
See application file for complete search history.

(56) References Cited

U.S. PATENT DOCUMENTS

| | | | |
|---|---|---|---|
| 7,301,924 B1 * | 11/2007 | Gurbuz et al. | 370/335 |
| 2003/0087673 A1 | 5/2003 | Walton | |
| 2003/0128658 A1 | 7/2003 | Walton | |
| 2003/0162519 A1 | 8/2003 | Smith et al. | |
| 2004/0121774 A1 * | 6/2004 | Rajkotia et al. | 455/441 |
| 2005/0118964 A1 * | 6/2005 | Johnston | 455/121 |

FOREIGN PATENT DOCUMENTS

| | | |
|---|---|---|
| WO | 98/52322 A1 | 11/1998 |
| WO | WO0199291 A2 | 12/2001 |

OTHER PUBLICATIONS

European Patent Office, Communication with European Search Report, in Application No. EP05016350, dated Sep. 1, 2010.

* cited by examiner

*Primary Examiner* — Pierre-Louis Desir
(74) *Attorney, Agent, or Firm* — Brinks Hofer Gilson & Lione

(57) ABSTRACT

A system and method for utilizing multiple communication pathways for communication hand-off (e.g., in a MIMO system). Various aspects of the present invention may comprise an access point communicating with a communication system utilizing a first number of transceivers. After determining to perform a hand-off of the communication system to a second access point, simultaneously, a second number of communication system transceivers may be utilized to communicate with the first access point and a third number of communication system transceivers may be utilized to communicate with the second access point. Various aspects of the present invention may also comprise an access point initially communicating with a communication system utilizing a first number of transceivers. After determining to hand-off the communication system, the access point may communicate with the communication system utilizing a second number of transceivers that is different from the first number of transceivers.

24 Claims, 7 Drawing Sheets

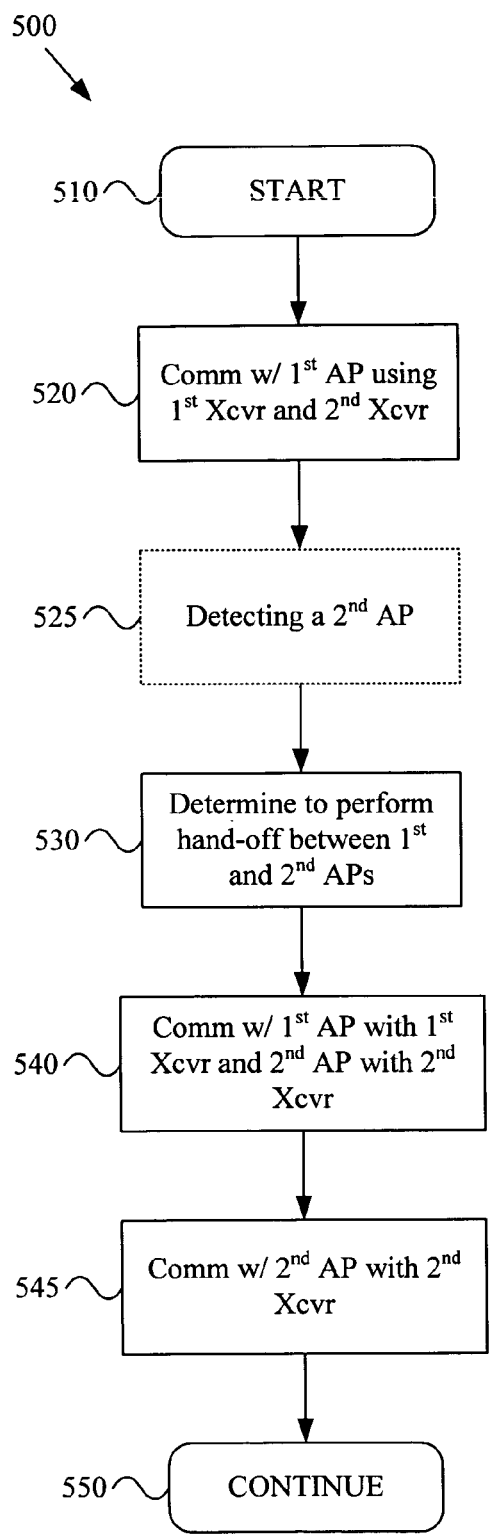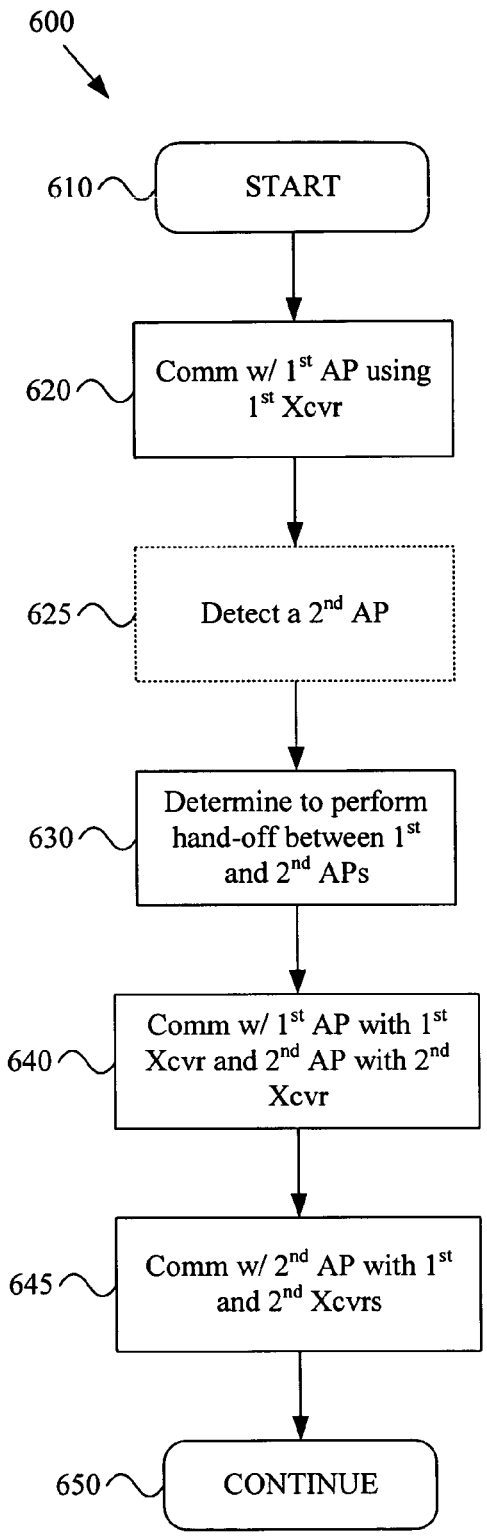
Figure 5
Figure 6

MULTI-TRANSCEIVER MULTI-PATH COMMUNICATION HANDOFF

CROSS-REFERENCE TO RELATED APPLICATIONS/INCORPORATION BY REFERENCE

This patent application is related to and claims priority from provisional patent application Ser. No. 60/601,189, filed Aug. 13, 2004, and titled "MULTI-TRANSCEIVER MULTI-PATH COMMUNICATION HANDOFF," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Communication networks may include access points, through which various communication systems may communicatively couple to the communication networks. In various scenarios (e.g., in communication scenarios involving mobile communication systems coupling to one or more communication networks), it may be advantageous to hand-off a communication system from one access point to another access point. Various reasons for such hand-offs may include, without limitation, communication quality or load balancing.

Communication system hand-offs may be problematic. For example, cellular phone calls are often dropped as a result of a failed hand-off. In such scenarios, while a communication system is communicatively coupled to a communication network through a first access point, a second access point may, for example, be assigned to communicatively couple the communication system to a communication network before the necessary communicating components are prepared for such communication. Thus, when the first access point no longer services the communication system, the communication system is left, at least temporarily, without a communicative coupling to the communication network. Such problematic communication system hand-offs are unacceptable.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for utilizing multiple communication pathways for communication hand-off (e.g., in a MIMO system), substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 5 shows a flow diagram of an exemplary method, in a communication system, for performing a communication hand-off, in accordance with various aspects of the present invention.

FIG. 6 shows a flow diagram of an exemplary method, in a communication system, for performing a communication hand-off, in accordance with various aspects of the present invention.

DETAILED DESCRIPTION OF THE INVENTION

Figure 1:
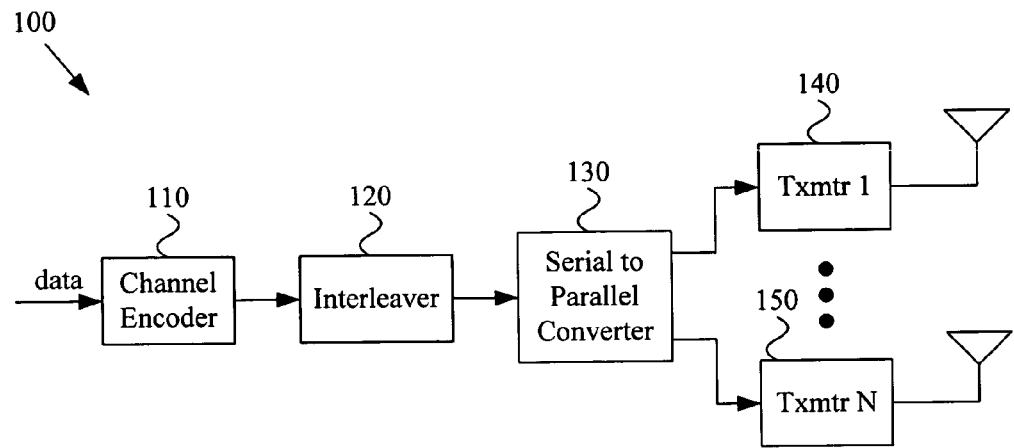
FIG. 1 is a diagram illustrating an exemplary MIMO transmitting configuration.
Figure 2:
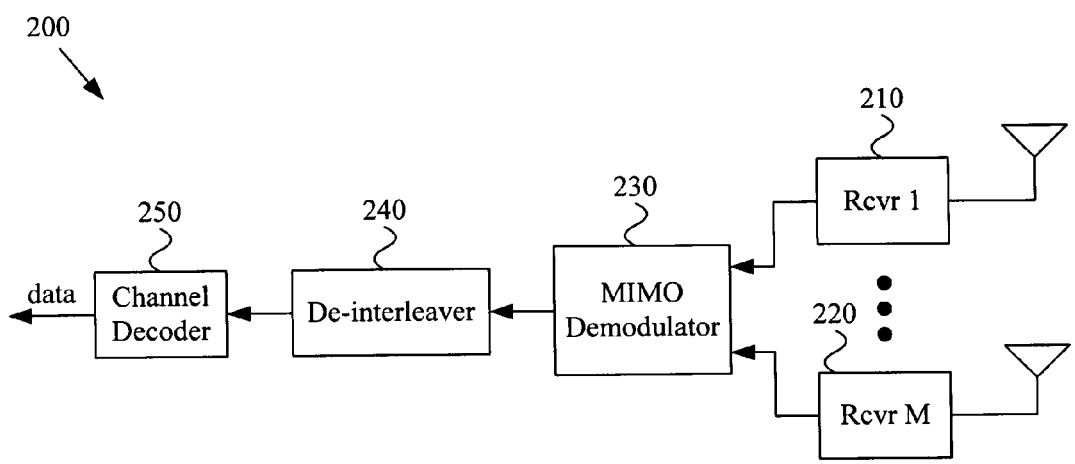
FIG. 2 is a diagram illustrating an exemplary MIMO receiving configuration.

The following discussion may illustrate various aspects of the present invention by referring to communication systems having Multiple-Input-Multiple-Output ("MIMO") communication capability. FIGS. 1 and 2 illustrate basic MIMO transmitting and receiving configurations, respectively. Note, however, that the scope of various aspects of the present invention should not be limited to MIMO, Multiple-Input-Single-Output ("MISO"), or Single-Input-Single-Output ("SISO") communication systems or characteristics thereof.

FIG. 1 is a diagram illustrating an exemplary communication system 100 having a Multiple-Input-Multiple-Output ("MIMO") transmitting configuration. The channel encoder 110 receives data. The data may comprise any of a variety of data types, including but not limited to, audio data, video data, textual data, graphical data, pictorial data, etc. The channel encoder 110 may comprise any of a variety of encoder types.

For example and without limitation, the channel encoder 110 may comprise characteristics of a conventional encoder, error correction encoder, MIMO encoder, etc.

The exemplary system 100 may comprise an interleaver 120 that receives the encoded data from the channel encoder 110. The interleaver 120 may, for example, perform interleaving to spread errors. The exemplary system 100 may comprise a serial-to-parallel converter 130 that divides the single data stream out of the interleaver 120 (or channel encoder 110) into a plurality of (e.g., up to N) parallel paths. The outputs of the serial-to-parallel converter 130 may be coupled to a plurality of transmitters (e.g., transmitter 140 through transmitter 150) and respective antennas for transmission.

FIG. 2 is a diagram illustrating an exemplary communication system 200 having an exemplary MIMO receiving configuration. A plurality of transmitted signals may arrive at the plurality of (e.g., up to M) antennas and respective receivers (e.g., receiver 210 through receiver 220). The receivers 210, 220 may provide the simultaneously received signals to a MIMO demodulator 230. The MIMO demodulator 230 may provide a serial stream of information to a de-interleaver 240 and to a channel decoder 250 to convert the received signals into output data.

Figure 3:
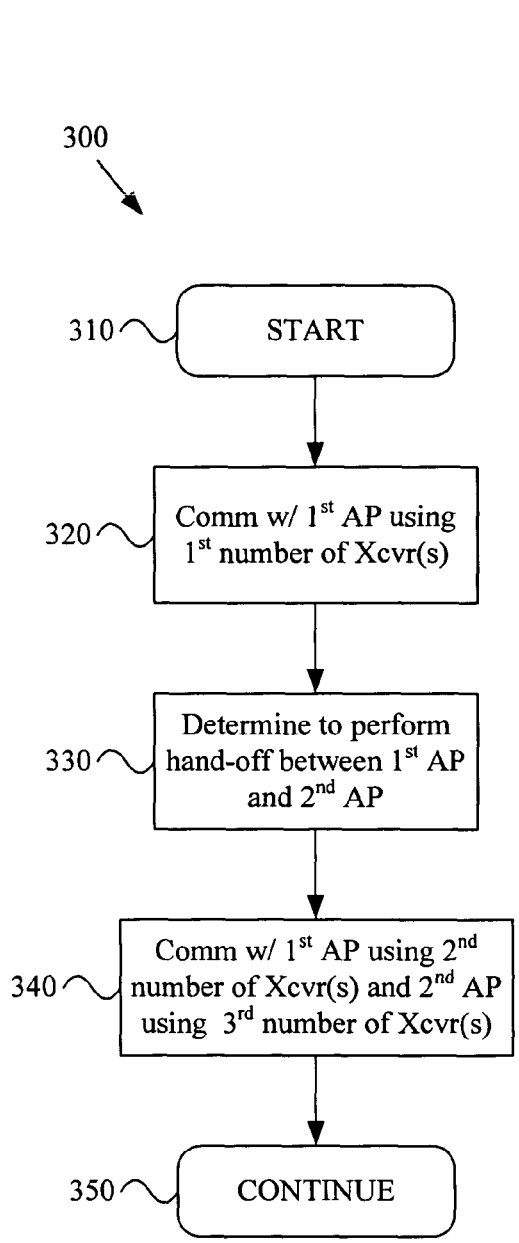
FIG. 3 shows a flow diagram of an exemplary method, in a communication system, for performing a communication hand-off, in accordance with various aspects of the present invention.

FIG. 3 shows a flow diagram of an exemplary method 300, in a communication system, for performing a communication hand-off, in accordance with various aspects of the present invention. The communication system may comprise characteristics of any of a variety of types of communication systems. For example and without limitation, first communication system may comprise characteristics of a cellular phone, paging device, portable multi-media communication device, pocket computer, personal digital assistant, portable telephone, desktop or portable computer, etc. Accordingly, the scope of various aspects of the present invention should not be limited by characteristics of a particular communication system.

The exemplary method 300 may begin at step 310. The exemplary method 300, and all methods discussed herein, may begin for any of a variety of reasons. For example and without limitation, the method 300 may begin executing when an alternative access point is detected. Also for example, the method 300 may begin executing upon command (e.g., from a communication system controller or from a user). Further for example, the method 300 may begin when communication quality or performance falls below a goal. Accordingly, the scope of various aspects of the present invention should not be limited by characteristics of any particular initiating event or condition.

The exemplary method 300 may, at step 320, comprise communicating with a first access point of a communication network utilizing a first number of transceivers. A transceiver may comprise characteristics of any of a variety of transceiver types. For example and without limitation, a transceiver may comprise characteristics of a wired, wireless or optical transceiver. A transceiver may, for example, communicate signals over any of a variety of media and in accordance with any of a variety of communication protocols and standards. Accordingly, the scope of various aspects of the present invention should not be limited by any particular type of transceiver.

A transceiver may comprise hardware and/or software components. A plurality of transceivers may be completely independent or may share various hardware and/or software components or modules. Accordingly, the scope of various aspects of the present invention should not be limited by arbitrary boundaries between transceivers. Additionally, various communication functions may be performed by a receiver, and various communication functions may be performed by a transmitter. In general, the following discussion will utilize the term "transceiver" to mean a "receiver and/or transmitter," depending on the context. For example, in a context where a signal is only sent, the term "transceiver" may be interchangeable with the term "transmitter." Accordingly, the scope of various aspects of the present invention should not be limited by arbitrary distinctions between transceivers, transmitters and receivers.

An access point of a communication network may comprise characteristics of any of a variety of types of communication network access points. For example and without limitation, an access point may comprise a base transceiver station of a cellular carrier's communication infrastructure. Also for example, an access point may comprise a wired, wireless or optical node of a Local Area Network ("LAN"). Further for example, an access point may comprise a wireless modem of a Personal Area Network ("PAN"). Additionally for example, an access point may comprise a communication satellite. Various characteristics of an access point may depend on characteristics of the communication network to which the access point provides access. Accordingly, the scope of various aspects of the present invention should not be limited by characteristics of any particular type of communication network access point.

The first number of transceivers may comprise one or more transceivers. Step 320 may, for example, comprise communicating with the first access point utilizing a single transceiver (e.g., in a SISO or MISO configuration). Also for example, step 320 may comprise communicating with the first access point utilizing a plurality of transceivers in a MIMO or MISO configuration. Further for example, step 320 may comprise communicating with the first access point utilizing a plurality of transceivers in a beam-forming configuration. The scope of various aspects of the present invention should not be limited by a particular first number or manner of utilizing the first number of transceivers to communicate with an access point.

The exemplary method 300 may, at step 330, comprise determining to perform a hand-off between the first access point and a second access point of a communication network. The first and second access points may both correspond to a single communication network or may correspond to different respective communication networks. For example and without limitation, the first and second access points may correspond to neighboring base transceiver stations of a cellular telecommunication network. Also for example, the first access point may correspond to a base transceiver station of a cellular telecommunication network, and the second access point may correspond to a wireless LAN access point (e.g., a wireless node in an office environment). Accordingly, the scope of various aspects of the present invention should not be limited by whether the first and second access points correspond to the same or different communication networks.

Step 330 may comprise determining to perform a hand-off in any of a variety of manners. For example and without limitation, step 330 may comprise determining to performing a hand-off in response to a command to do so (e.g., from a communication network controller or from a user). Also for example, step 330 may comprise determining to perform a hand-off in response to present communication quality. Step 330 may, for example, comprise determining to perform a hand-off based, at least in part, on communication quality or performance goals. Additionally for example, step 330 may comprise determining to perform a hand-off based, at least in part, on energy considerations (e.g., amount of available energy or energy-efficiency goals). Still further for example, step 330 may comprise determining to perform a hand-off based on a comparison of respective measured signal strengths for a plurality of access points. Also for example, step 330 may comprise determining to perform a hand-off based on respective amounts of traffic for a plurality of access points. Accordingly, the scope of various aspects of the present invention should not be limited by characteristics of any particular manner of determining to perform a hand-off.

The exemplary method 300 may, at step 340, comprise (e.g., after determining to perform a hand-off at step 330) simultaneously communicating with the first access point utilizing a second number of transceivers while communicating with the second access point utilizing a third number of transceivers. The second and third numbers of transceivers may each comprise one or more transceivers.

Step 340 may, for example, comprise communicating with the first access point utilizing a single transceiver (e.g., in a SISO or MISO configuration) and communicating with the second access point utilizing a single transceiver. Also for example, step 340 may comprise communicating with the first access point utilizing a single transceiver and communicating with the second access point utilizing a plurality of transceivers (e.g., in a MIMO or beam-forming configuration). Further for example, step 340 may comprise communicating with the first access point utilizing a plurality of transceivers (e.g., in a MIMO or beam-forming configuration) and communicating with the second access point utilizing a single transceiver. Still further for example, step 340 may comprise communicating with the first access point utilizing a first plurality of transceivers (e.g., in a MIMO, MISO or beam-forming configuration) and communicating with the second access point utilizing a second plurality of transceivers (e.g., in a MIMO or beam-forming configuration). Also for example, step 340 may comprise communicating with the first access point utilizing a first plurality of transceivers (e.g. in an order-N MIMO configuration) and communicating with the second access point utilizing a second plurality of transceivers (e.g., in an order-M MIMO configuration, where M may or may not equal N). The scope of various aspects of the present invention should not be limited by a particular second and third number of transceivers or manner of utilizing the second and third numbers of transceivers to communicate with an access point.

The exemplary method 300 may, at step 350, comprise performing continued processing. Such continued processing may comprise performing any of a large variety of continued processing. For example and without limitation, step 350 may comprise communicating with the second access point utilizing a fourth number of transceivers and ending communication with the first access point. Also for example, step 350 may comprise performing various processing in support of general communication and user interface functionality. Further for example, step 350 may comprise looping execution of the exemplary method 300 back up to steps 320 or 330. Accordingly, the scope of various aspects of the present invention should not be limited by characteristics of any particular continued processing.

The exemplary method 300 was presented to provide specific examples of generally broader aspects of the present invention. Accordingly, the scope of various aspects of the present invention should not be limited by characteristics of the exemplary method 300.

Figure 4:
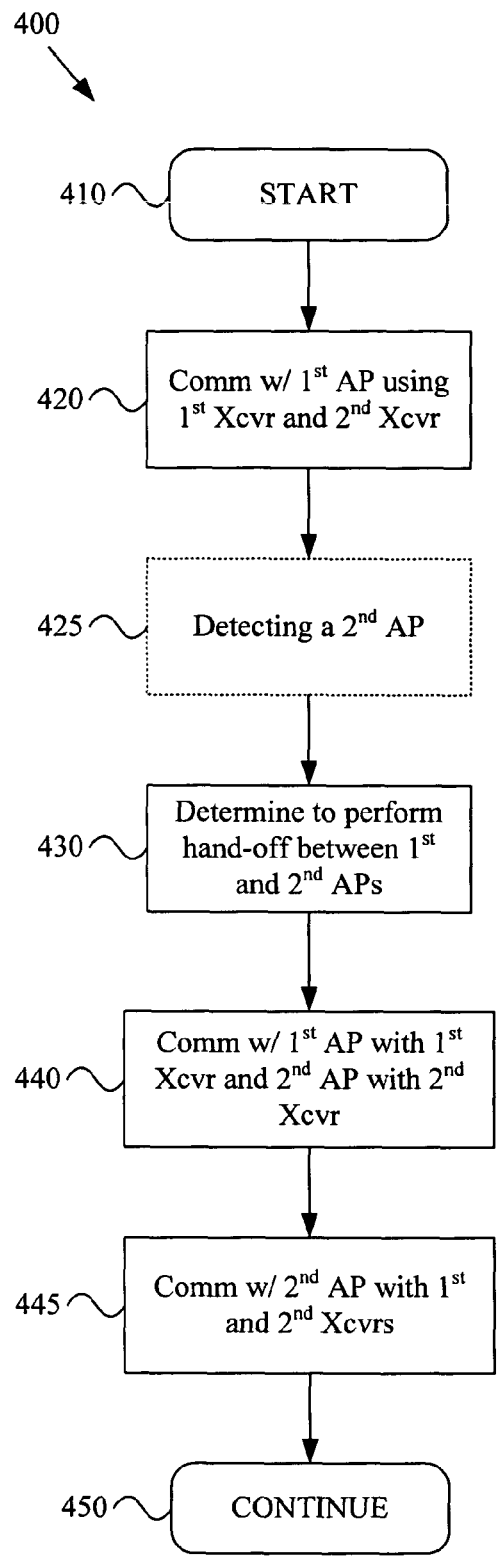
FIG. 4 shows a flow diagram of an exemplary method, in a communication system, for performing a communication hand-off, in accordance with various aspects of the present invention.

FIG. 4 shows a flow diagram of an exemplary method 400, in a communication system, for performing a communication hand-off, in accordance with various aspects of the present invention. The exemplary method 400 may, for example and without limitation, share various characteristics of the exemplary method 300 illustrated in FIG. 3 and discussed previously.

The exemplary method 400 may, at step 420, comprise communicating with a first access point of a communication network utilizing a first transceiver and a second transceiver (i.e., at least a first transceiver and a second transceiver). Step 420 may, for example and without limitation, share various characteristics with step 320 of the exemplary method 300 illustrated in FIG. 3 and discussed previously. For example, in a non-limiting exemplary scenario where the first access point comprises MIMO communication capability, step 420 may comprise communicating with the first access point utilizing a first transceiver and a second transceiver in a MIMO configuration.

The method 400 may, at step 425 comprise detecting the presence of a second access point of a communication network. As discussed previously, such a second access point may be an access point for the same communication network as the first access point or may correspond to a different communication network. Step 425 may, for example and without limitation, comprise listening for access point beacon signals. Step 425 may also, for example, comprise transmitting beacon signals to access points and listening for response messages from an access point.

In general, step 425 may comprise detecting the presence of a second access point in any of variety of manners. Also, exemplary step 425 is presented as an illustrative option for the exemplary method 400. Accordingly, the scope of various aspects of the present invention should not be limited by the existence or absence of exemplary step 425, or by characteristic of any particular manner of detecting an access point.

The exemplary method 400 may, at step 430, comprise determining to perform a hand-off between the first access point and the second access point. Step 430 may, for example and without limitation, share various characteristics with step 330 of the exemplary method 300 illustrated in FIG. 3 and discussed previously.

The exemplary method 400 may, at step 440, comprise communicating with the first access point utilizing the first transceiver (i.e., at least the first transceiver) and communicating with the second access point utilizing the second transceiver (i.e., at least the second transceiver). Step 440 may, for example and without limitation, share various characteristics with the step 340 of the exemplary method 300 illustrated in FIG. 3 and discussed previously.

The exemplary method 400 may, at step 445, comprise (e.g., after simultaneously communicating with the first access point utilizing the first transceiver and communicating with the second access point utilizing the second transceiver) communicating with the second access point utilizing the first and second transceivers (i.e., at least the first and second transceivers). In a non-limiting exemplary scenario in which the second access point comprises MIMO communication capability, the first and second transceivers may be utilized in a MIMO configuration. In a non-limiting exemplary scenario, step 445 may also comprise ending communication with the first access point.

The exemplary method 400 was presented to provide specific examples of generally broader aspects of the present invention. Accordingly, the scope of various aspects of the present invention should not be limited by characteristics of the exemplary method 400.

FIG. 5 shows a flow diagram of an exemplary method 500, in a communication system, for performing a communication hand-off, in accordance with various aspects of the present invention. The exemplary method 500 may, for example and without limitation, share various characteristics with the exemplary methods 300-400 illustrated in FIGS. 3-4 and discussed previously. For example, exemplary steps 510-540 may share various characteristics with corresponding exemplary steps 410-440 of the exemplary method 400.

The exemplary method 500 may, at step 545, comprise communicating with the second access point utilizing the second transceiver (e.g., in a SISO or MISO mode). In a non-limiting exemplary scenario, step 520 may comprise communicating with the first access point utilizing the first and second transceivers (i.e., at least the first and second transceivers) in a MIMO configuration, and step 545 may comprise communicating with the second access point utilizing only the second transceiver.

The exemplary method 500 was presented to provide specific examples of generally broader aspects of the present invention. Accordingly, the scope of various aspects of the present invention should not be limited by characteristics of the exemplary method 500.

FIG. 6 shows a flow diagram of an exemplary method 600, in a communication system, for performing a communication hand-off, in accordance with various aspects of the present invention. The exemplary method 600 may, for example and without limitation, share various characteristics with the exemplary methods 300-500 illustrated in FIGS. 3-5 and discussed previously. For example, exemplary steps 625-650 may share various characteristics with corresponding exemplary steps 425-450 of the exemplary method 400.

The exemplary method 600 may, at step 620, comprise communicating with the first access point utilizing the first transceiver (e.g., in a SISO or MISO mode). In a non-limiting exemplary scenario, step 620 may comprise communicating with the first access point utilizing only the first transceiver in a SISO configuration, and step 645 may comprise communicating with the second access point utilizing the first and second transceivers (i.e., at least the first and second transceivers) in a MIMO configuration.

The exemplary method 600 was presented to provide specific examples of generally broader aspects of the present invention. Accordingly, the scope of various aspects of the present invention should not be limited by characteristics of the exemplary method 600.

Figure 7:
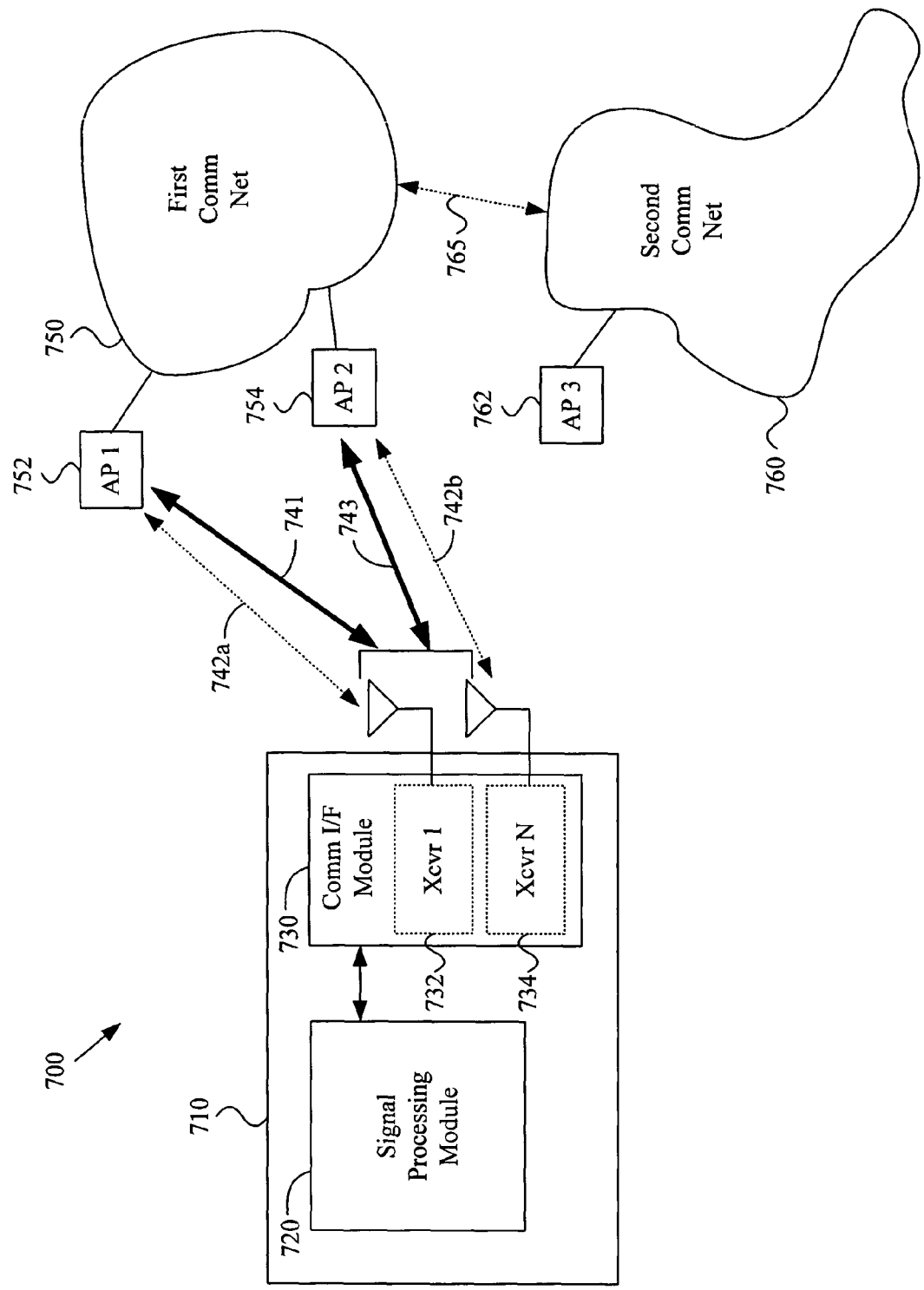
FIG. 7 shows an exemplary communication environment comprising a communication system that performs a communication hand-off, in accordance with various aspects of the present invention.

FIG. 7 shows an exemplary communication environment 700 comprising a communication system 710 that performs a communication hand-off, in accordance with various aspects of the present invention. The exemplary communication system 710 may, for example and without limitation, share various functional characteristics with the exemplary methods 300-600 shown in FIGS. 3-6 and discussed previously. Also, for example, the exemplary communication system 710 may share various characteristics with the exemplary MIMO systems illustrated in FIGS. 1-2.

The exemplary communication system 710 comprises a signal processing module 720 and a communication interface module 730. The communication interface module 730 comprises a first transceiver 732 through an $N^{th}$ transceiver 734, which may also be referred to herein, in various illustrative scenarios, as the second transceiver 734. Each of the illustrated transceivers 732, 734 is coupled to respective antennas.

The communication system 710 may comprise characteristics of any of a variety of types of communication systems. For example and without limitation, first communication system may comprise characteristics of a cellular phone, paging device, portable multi-media communication device, pocket computer, personal digital assistant, portable telephone, desktop or portable computer, etc. Accordingly, the scope of various aspects of the present invention should not be limited by characteristics of a particular communication system.

A transceiver (e.g., the first transceiver 732 or second transceiver 734) may comprise characteristics of any of a variety of transceiver types. For example and without limitation, a transceiver may comprise characteristics of a wired, wireless or optical transceiver. A transceiver may, for example, communicate signals over any of a variety of media and in accordance with any of a variety of communication protocols and standards. Accordingly, the scope of various aspects of the present invention should not be limited by any particular type of transceiver.

A transceiver may comprise hardware and/or software components. A plurality of transceivers may be completely independent or may share various hardware and/or software components or modules. Accordingly, the scope of various aspects of the present invention should not be limited by arbitrary boundaries between transceivers. Additionally, various communication functions may be performed by a receiver, and various communication functions may be performed by a transmitter. In general, the following discussion will utilize the term "transceiver" to mean a "receiver and/or transmitter," depending on the context. For example, in a context where a signal is only sent, the term "transceiver" may be interchangeable with the term "transmitter." Accordingly, the scope of various aspects of the present invention should not be limited by arbitrary distinctions between transceivers, transmitters and receivers.

The exemplary communication environment 700 also comprises a first communication network 750 that includes a first access point 752 and a second access point 754 through which the communication system 710 may communicate with the first communication network 750. The exemplary communication environment 700 also comprises an exemplary second communication network 760, which may be communicatively coupled to the first communication network 750 through communication link 765. The exemplary second communication network 760 may comprise a third access point 762.

A communication network (e.g., first communication network 750 and second communication network 760) may comprise characteristics of any of a variety of communication network types. For example and without limitation, a communication network may comprise characteristics of a telecommunication network, computer network, television network, satellite or terrestrial communication network, wide area or local area or personal area communication network, wireless or wired or optical communication network, etc. Accordingly, the scope of various aspects of the present invention should not be limited by characteristics of any particular type of communication network.

An access point (e.g., first access point 752, second access point 754 and third access point 762) of a communication network (e.g., first communication network 750 and second communication network 760) may comprise characteristics of any of a variety of types of communication network access points. For example and without limitation, an access point may comprise a base transceiver station of a cellular carrier's communication infrastructure. Also for example, an access point may comprise a wired, wireless or optical node of a Local Area Network ("LAN"). Further for example, an access point may comprise a wireless modem of a Personal Area Network ("PAN"). Additionally for example, an access point may comprise a communication satellite. Various characteristics of an access point may depend on characteristics of the communication network to which the access point provides access. Accordingly, the scope of various aspects of the present invention should not be limited by characteristics of any particular type of communication network access point.

As mentioned previously, the exemplary communication system 710 may comprise a plurality of transceivers (e.g., the first transceiver 732 through the $N^{th}$ transceiver 734). The communication system 710 (e.g., the signal processing module 720) may utilize a first number of transceivers to communicate with a first access point (e.g., the first access point 752). For example and without limitation, the exemplary communication system 710 may share various functional characteristics with steps 320, 420, 520 and 620 of the exemplary methods 300-600 illustrated in FIGS. 3-6 and discussed previously. The first number of transceivers may comprise one or more transceivers.

The communication system 710 may, for example, communicate with the first access point 752 utilizing a single transceiver (e.g., the first transceiver 732), for example in a SISO or MISO configuration. Also for example, the communication system 710 may communicate with the first access point 752 utilizing a plurality of transceivers (e.g., the first transceiver 732 through $N^{th}$ transceiver 734), for example in a MIMO configuration. Further for example, the communication system 710 may communicate with the first access point 752 utilizing a plurality of transceivers in a beam-forming configuration. The scope of various aspects of the present invention should not be limited by a particular first number or manner of utilizing the first number of transceivers to communicate with an access point.

The communication system 710 (e.g., the signal processing module 720) may, for example, determine to perform a hand-off between a first access point (e.g., the first access point 752) of a communication network and a second access point of a communication network. For example and without limitation, the exemplary communication system 710 may share various functional characteristics with steps 330, 430, 530 and 630 of the exemplary methods 300-600 illustrated in FIGS. 3-6 and discussed previously.

The second access point may, for example, comprise another access point (e.g., the second access point 754) of the same communication network as the first access point (e.g., the first communication network 750). Alternatively, for example, the second access point may comprise an access point (e.g., the third access point 762) of a different communication network (e.g., the second communication network 760) than the communication network of the first access point. The following discussion will generally discuss communication system hand-off between the first access point 752 and the second access point 754, both of the first communication network 750. It should be noted, however, that this is merely exemplary. Accordingly, the scope of various aspects of the present invention should not be limited to hand-off scenarios between access points of the same communication network.

In an exemplary scenario, the first access point 752 and second access point 754 might correspond to neighboring base transceiver stations of a cellular communication network 750. Also in the exemplary scenario, the third access point 762 may correspond to a wireless access point of an office LAN 760 that is communicatively coupled to the cellular communication network 750 through communication link 765.

The communication system 710 (e.g., the signal processing module 720) may determine to perform a hand-off in any of a variety of manners. For example and without limitation, the communication system 710 may determine to perform a hand-off in response to a command to do so (e.g., from a communication network controller or from a user). Also for example, the communication system 710 may determine to perform a hand-off in response to present communication quality. The communication system 710 may, for example, determine to perform a hand-off based, at least in part, on communication quality or performance goals. Additionally for example, the communication system 710 may determine to perform a hand-off based, at least in part, on energy considerations (e.g., amount of available energy or energy-efficiency goals). Still further for example, the communication system 710 may determine to perform a hand-off based on a comparison of respective measured signal strengths for a plurality of access points. Also for example, the communication system 710 may determine to perform a hand-off based on respective amounts of traffic for a plurality of access points. Accordingly, the scope of various aspects of the present invention should not be limited by characteristics of any particular manner of determining to perform a hand-off or corresponding apparatus for making such determination.

The communication system 710 may, for example, comprise (e.g., after determining to perform a hand-off) simultaneously communicating with the first access point 752 utilizing a second number of transceivers while communicating with the second access point 754 utilizing a third number of transceivers. For example and without limitation, the exemplary communication system 710 may share various functional characteristics with steps 340, 440, 540 and 640 of the exemplary methods 300-600 illustrated in FIGS. 3-6 and discussed previously. The second and third numbers of transceivers may each comprise one or more transceivers.

The communication system 710 may, for example, communicate with the first access point 752 utilizing a single transceiver (e.g., the first transceiver 732 in a SISO or MISO configuration) and communicating with the second access point 754 utilizing a single transceiver (e.g., the second transceiver 734 in a SISO configuration). Also for example, the communication system 710 may communicate with the first access point 752 utilizing a single transceiver and communicating with the second access point 754 utilizing a plurality of the N transceivers (e.g., in a MIMO, MISO or beam-forming configuration). Further for example, the communication system 710 may communicate with the first access point 752 utilizing a plurality of the N transceivers (e.g., in a MIMO or beam-forming configuration) and communicating with the second access point 754 utilizing a single transceiver. Still further for example, the communication system 710 may communicate with the first access point 752 utilizing a first plurality of the N transceivers (e.g., in a MIMO or beam-forming configuration) and communicating with the second access point 754 utilizing a second plurality of the N transceivers (e.g., in a MIMO or beam-forming configuration). Also for example, the communication system 710 may communicate with the first access point 752 utilizing a first plurality of the N transceivers (e.g., in an order-X MIMO configuration) and communicating with the second access point 754 utilizing a second plurality of the N transceivers (e.g., in an order-Y MIMO configuration, where Y may or may not equal X). The scope of various aspects of the present invention should not be limited by a particular second and third number of transceivers or manner of utilizing the second and third numbers of transceivers to communicate with an access point.

The communication system 710 (e.g., the signal processing module 720) may, for example, perform additional processing. Such additional processing may comprise any of a large variety of additional processing. For example and without limitation, the communication system 710 may communicate with the second access point 754 utilizing a fourth number of transceivers and ending communication with the first access point 752. Also for example, the communication system 710 may perform any of a variety of processing in support of general communication and user interface functionality. Further for example, the communication system 710 may process or manage additional communication system hand-offs. Accordingly, the scope of various aspects of the present invention should not be limited by characteristics of any particular additional processing.

In a first non-limiting exemplary scenario, the communication system 710 may initially communicate with the first access point 754 of the communication network 750 utilizing the first transceiver 732 and the second transceiver 734 (i.e., at least the first transceiver 732 and the second transceiver 734). The communication system 710 may, for example and without limitation, share various functional characteristics with step 420 of the exemplary method 400 illustrated in FIG. 4 and discussed previously. For example, in a non-limiting exemplary scenario where the first access point 752 comprises MIMO communication capability, the communication system 710 may communicate with the first access point 752 utilizing the first transceiver 732 and the second transceiver 734 in a MIMO configuration.

Continuing the first non-limiting exemplary scenario, the communication system 710 may detect the presence of the second access point 754 of the first communication network 750. For example and without limitation, the exemplary communication system 710 may share various functional characteristics with step 425 of the exemplary method 400 illustrated in FIG. 4 and discussed previously. As discussed previously, such a second access point may be an access point for the same communication network as the first access point or may correspond to a different communication network. The communication system 710 may detect the second access point 754 in any of a variety of manners. For example, the communication system 710 may listen for access point beacon signals. The communication system 710 may also, for example, transmit beacon signals to access points and listening for response messages from an access point.

In general, the communication system 710 may detect the presence of a second access point in any of variety of manners. Also, such access point detection functionality was presented as an illustrative option for the communication system 710. Accordingly, the scope of various aspects of the present invention should not be limited by the existence or absence of such detection functionality, or by characteristics of any particular manner of detecting an access point or related apparatus.

Continuing the first non-limiting exemplary scenario, the communication system 710 may determine to perform a hand-off between the first access point 752 and the second access point 754. The communication system 710 may, for example and without limitation, share various functional characteristics with step 430 of the exemplary method 400 illustrated in FIG. 4 and discussed previously. For example, the communication system 710 may make such hand-off determination in any of a variety of manners. Accordingly, the scope of various aspects of the present invention should not be limited by a particular manner of making such hand-off determination.

Continuing the first non-limiting exemplary scenario, the communication system 710 may simultaneously communicate with the first access point 752 utilizing the first transceiver 732 (i.e., at least the first transceiver 732) while communicating with the second access point 754 utilizing the second transceiver 734 (i.e., at least the second transceiver 734). The communication system 710 may, for example and without limitation, share various functional characteristics with step 440 of the exemplary method 400 illustrated in FIG. 4 and discussed previously.

Continuing the first non-limiting exemplary scenario, the communication system 710 may (e.g., after simultaneously communicating with the first access point utilizing the first transceiver while communicating with the second access point utilizing the second transceiver) communicate with the second access point 754 utilizing the first and second transceivers 732, 734 (i.e., at least the first and second transceivers 732, 734). In a non-limiting exemplary scenario in which the second access point 754 comprises MIMO communication capability, the communication system 710 may utilize the first and second transceivers 732, 734 in a MIMO configuration. In a non-limiting exemplary scenario, the communication system 710 may also end communication with the first access point 752.

In a second non-limiting exemplary scenario, the communication system 710 may initially communicate with the first access point 752 utilizing the first and second transceivers 732, 734 (i.e., at least the first and second transceivers 732, 734) in a MIMO configuration, and then communicate with the second access point 754 utilizing only the second transceiver 734. For example and without limitation, the communication system 710 may share various functional characteristics with the exemplary method 500 illustrated in FIG. 5 and discussed previously.

In a third non-limiting exemplary scenario, the communication system 710 may initially communicate with the first access point 752 utilizing only the first transceiver 732, and then communicate with the second access point 754 utilizing the first and second transceivers 732, 734 (i.e., at least the first and second transceivers 732, 734) in a MIMO configuration. For example and without limitation, the communication system 710 may share various functional characteristics with the exemplary method 600 illustrated in FIG. 6 and discussed previously.

The exemplary communication environment 700 and communication system 710 were presented to provide specific examples of generally broader aspects of the present invention. Accordingly, the scope of various aspects of the present invention should not be limited by characteristics of the exemplary environment 700 or communication system 710.

Figure 8:
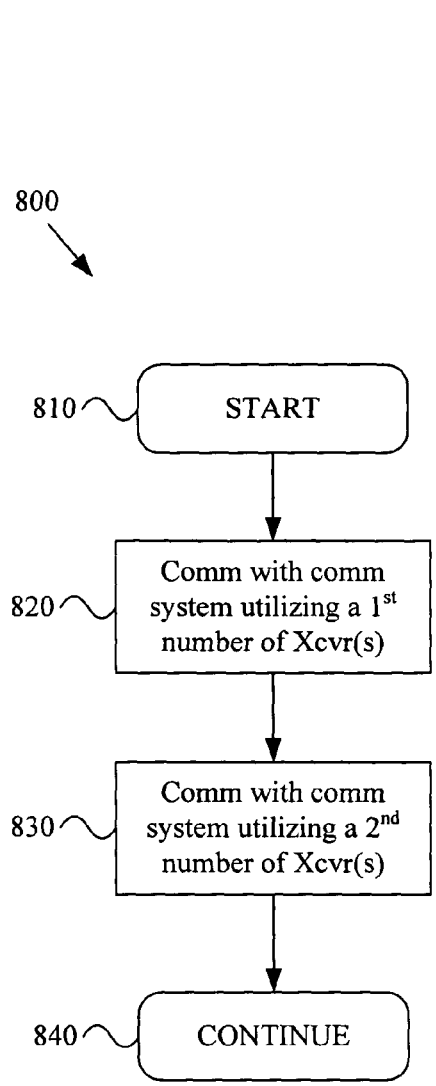
FIG. 8 shows a flow diagram of an exemplary method, in a communication network, for performing a communication hand-off, in accordance with various aspects of the present invention.

FIG. 8 shows a flow diagram of an exemplary method 800, in a communication network, for performing a communication hand-off, in accordance with various aspects of the present invention. The exemplary method 800 may be performed in one or more components of any of a variety of communication network types (e.g. cellular phone, paging, portable multi-media communication, computer, LAN, PAN, etc.). The exemplary method 800 may, for example, be performed in an access point of a communication network. Also for example, the exemplary method 800 may be performed in an access point in conjunction with a central controller of a communication network. Further for example, the exemplary method 800 may be implemented in an access point in conjunction with a user's communication system. Accordingly, the scope of various aspects of the present invention should not be limited by characteristics of a particular system or system component that may implement the exemplary method 800 or a portion thereof.

The exemplary method 800 may begin at step 810. The exemplary method 800, and all methods discussed herein, may begin for any of a variety of reasons. For example and without limitation, the method 800 may begin executing when an alternative access point detects the presence of a roaming communication system. Also for example, the method 800 may begin executing upon command (e.g., from a communication system controller or from a user of a communication system). Further for example, the method 800 may begin when communication quality or performance falls below a goal. Accordingly, the scope of various aspects of the present invention should not be limited by characteristics of any particular initiating event or condition.

The exemplary method 800 may, at step 820, comprise communicating with a communication system utilizing a first number of transceivers of a first access point. As discussed previously, a transceiver may comprise characteristics of any of a variety of transceiver types. Accordingly, the scope of various aspects of the present invention should not be limited by characteristics of any particular type of transceiver.

Also, as discussed previously, an access point of a communication network may comprise characteristics of any of a variety of types of communication network access points. Accordingly, the scope of various aspects of the present invention should not be limited by characteristics of any particular type of communication network access point.

Further, as discussed previously, the communication system may comprise characteristics of any of a variety of types of communication systems. For example and without limitation, a communication system may comprise characteristics of a cellular phone, paging device, portable multi-media communication device, pocket computer, personal digital assistant, portable telephone, desktop or portable computer, handheld communication device, etc. Accordingly, the scope of various aspects of the present invention should not be limited by characteristics of a particular communication system.

The first number of transceivers may comprise one or more transceivers of the first access point. Step 820 may, for example, comprise communicating with the communication system utilizing a single transceiver of the access point, for example in a SISO configuration. Also for example, step 820 may comprise communicating with the communication system utilizing a plurality of transceivers of the access point in a MIMO configuration (e.g., an order-N MIMO configuration). Further for example, step 820 may comprise communicating with the communication system utilizing a plurality of transceivers of the access point in a beam-forming configuration. The scope of various aspects of the present invention should not be limited by a particular first number or manner of utilizing the first number of transceivers to communicate with a communication system.

The exemplary method 800 may, at step 830, comprise (e.g., after determining to hand off the communication system) communicating with the communication system utilizing a second number of transceivers of the first access point (e.g., where the second number is different from the first number).

The second number of transceivers may comprise one or more transceivers of the first access point. The second number of transceivers may, for example and without limitation, comprise one or more of the first number of transceivers utilized at step 820. In a first non-limiting exemplary scenario, the second number of transceivers might be less than the first number of transceivers.

Step 830 may, for example, comprise communicating with the communication system utilizing a single transceiver of the access point, for example in a SISO or MISO configuration. Also for example, step 830 may comprise communicating with the communication system utilizing a plurality of transceivers of the access point in a MIMO or MISO configuration (e.g., an order-M MIMO configuration, where M may or may not be different from N). Further for example, step 830 may comprise communicating with the communication system utilizing a plurality of transceivers of the access point in a beam-forming configuration. The scope of various aspects of the present invention should not be limited by a particular second number or manner of utilizing the second number of transceivers to communicate with a communication system.

The exemplary method 800 may, at step 840, comprise performing continued processing. Such continued processing may comprise performing any of a large variety of continued processing. For example and without limitation, step 840 may comprise communicating with the communication system utilizing a third number of transceivers or ending communication between the first access point and the communication system. Also for example, step 840 may comprise performing various processing in support of general communication and communication network maintenance. Further for example, step 840 may comprise looping execution of the exemplary method 800 back up to step 820 for communicating with another communication system. Accordingly, the scope of various aspects of the present invention should not be limited by characteristics of any particular continued processing.

The exemplary method 800 was presented to provide specific examples of generally broader aspects of the present invention. Accordingly, the scope of various aspects of the present invention should not be limited by characteristics of the exemplary method 800.

Figure 9:
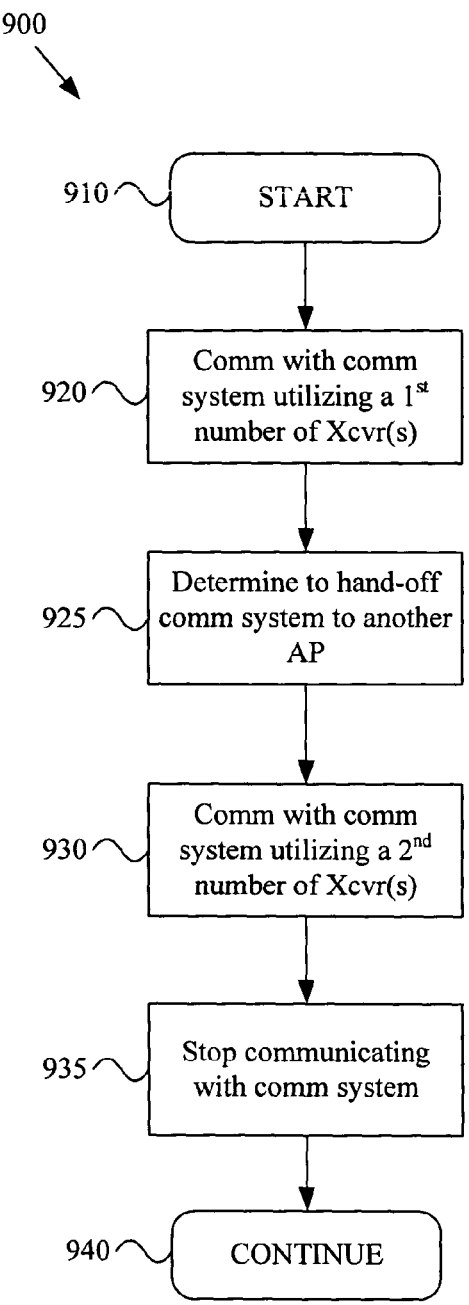
FIG. 9 shows a flow diagram of an exemplary method, in a communication network, for performing a communication hand-off, in accordance with various aspects of the present invention.

FIG. 9 shows a flow diagram of an exemplary method 900, in a communication network, for performing a communication hand-off, in accordance with various aspects of the present invention. The exemplary method 800 may, for example and without limitation, share various characteristics with the exemplary method 800 illustrated in FIG. 8 and discussed previously. The exemplary method 900 may, for example, generally illustrate a method for handing off a communication system to another access point.

The exemplary method 900 may, at step 920, comprise communicating with a communication system utilizing a first number of transceivers of a first access point. Exemplary step 920 may, for example and without limitation, share various characteristics with step 820 of the exemplary method 800 illustrated in FIG. 8 and discussed previously.

The exemplary method 900 may, at step 925, comprise determining to hand off the communication system from the first access point to a second access point. Exemplary step 925 may, for example, share various characteristics with step 330 of the exemplary method 300 illustrated in FIG. 3 and discussed previously.

For example, the first and second access points may both correspond to a single communication network or may correspond to different respective communication networks. In an exemplary scenario, the first and second access points may correspond to neighboring base transceiver stations of a cellular network. In another exemplary scenario, the first access point may correspond to a base transceiver station of a cellular telecommunication network, and the second access point may correspond to a wireless LAN access point (e.g., a wireless node in an office environment). Accordingly, the scope of various aspects of the present invention should not be limited by whether the first and second access points correspond to the same or different communication networks.

Step 925 may comprise determining to perform a hand-off in any of a variety of manners. For example and without limitation, step 925 may comprise determining to perform a hand-off in response to a command or request to do so (e.g., from a communication network controller or the second access point). Also for example, step 925 may comprise determining to perform a hand-off in response to present communication quality. Step 925 may, for example, comprise determining to perform a hand-off based, at least in part, on communication quality or performance goals. Additionally for example, step 925 may comprise determining to perform a hand-off based, at least in part, on energy considerations (e.g., amount of available energy or energy-efficiency goals). Still further for example, step 925 may comprise determining to perform a hand-off based on a comparison of respective measured signal strengths (e.g., as measured at the communication system) for a plurality of access points. Also for example, step 925 may comprise determining to perform a hand-off based on respective amounts of traffic for a plurality of access points. Accordingly, the scope of various aspects of the present invention should not be limited by characteristics of any particular manner of determining to perform a hand-off.

The exemplary method 900 may, at step 930, comprise (e.g., after determining to hand-off the communication system at step 925) communicating with the communication system utilizing a second number of transceivers of the first access point (e.g., where the second number is different from the first number). Step 930 may, for example and without limitation, share various characteristics with step 830 of the exemplary method 800 illustrated in FIG. 8 and discussed previously.

The exemplary method 900 may, at step 935, comprise ending communication between the first access point and the communication system. In a non-limiting exemplary scenario, step 920 may comprise communicating with the communication system utilizing four transceivers in a MIMO configuration, step 930 may comprise communicating with the communication system utilizing one or two transceivers, and step 935 comprises ending communication between the first access point and the communication system.

The exemplary method 900 was presented to provide specific examples of generally broader aspects of the present invention. Accordingly, the scope of various aspects of the present invention should not be limited by characteristics of the exemplary method 900.

Figure 10:
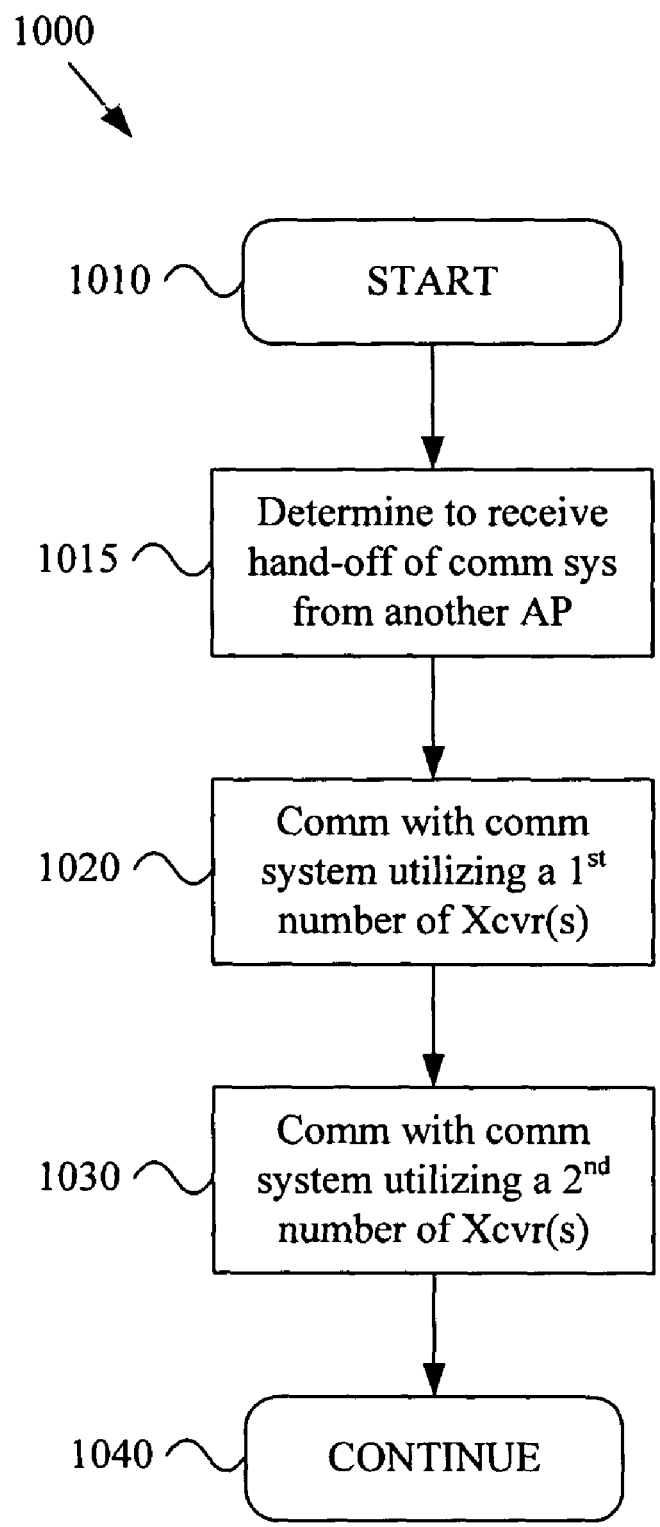
FIG. 10 shows a flow diagram of an exemplary method, in a communication network, for performing a communication hand-off, in accordance with various aspects of the present invention.

FIG. 10 shows a flow diagram of an exemplary method 1000, in a communication network, for performing a communication hand-off, in accordance with various aspects of the present invention. The exemplary method 1000 may share various characteristics with the exemplary method 800 illustrated in FIG. 8 and discussed previously. The exemplary method 1000 may, for example, generally illustrate a method for receiving a communication system hand-off from another access point.

The exemplary method 1000 may, at step 1015, comprise determining to receive a hand-off of the communication system from a second access point. Exemplary step 1015 may, for example, share various characteristics with step 330 of the exemplary method 300 illustrated in FIG. 3 and discussed previously. For example, the first and second access points may both correspond to a single communication network or may correspond to independent respective communication networks.

Step 1015 may comprise determining to receive a hand-off in any of a variety of manners. For example and without limitation, step 1015 may comprise determining to receive a hand-off in response to a command or request to do so (e.g., from a communication network controller or the access point that is handing off the communication system). Also for example, step 1015 may comprise determining to receive a hand-off in response to present communication quality. Step 1015 may, for example, comprise determining to receive a hand-off based, at least in part, on communication quality or performance goals. Additionally for example, step 1015 may comprise determining to receive a hand-off based, at least in part, on energy considerations (e.g., amount of available energy or energy-efficiency goals). Still further for example, step 1015 may comprise determining to receive a hand-off based on a comparison of respective measured signal strengths (e.g., as measured at the communication system) for a plurality of access points. Also for example, step 1015 may comprise determining to receive a hand-off based on respective amounts of traffic for a plurality of access points. Accordingly, the scope of various aspects of the present invention should not be limited by characteristics of any particular manner of determining to receive a hand-off.

The exemplary method 1000 may, at step 1020, comprise (e.g., after determining to receive the communication system hand-off from a second access point at step 1015) communicating with a communication system utilizing a first number of transceivers of the first access point. Exemplary step 1020 may, for example and without limitation, share various characteristics with steps 820 and 920 of the exemplary methods 800-900 illustrated in FIGS. 8-9 and discussed previously.

The exemplary method 1000 may, at step 1030, comprise communicating with the communication system utilizing a second number of transceivers of the first access point (e.g., where the second number is different from the first number). Step 1030 may, for example and without limitation, share various characteristics with steps 830 and 930 of the exemplary methods 800-900 illustrated in FIGS. 8-9 and discussed previously.

In a non-limiting exemplary scenario, step 1020 may comprise communicating with the communication system utilizing one transceiver (e.g., in a SISO configuration) or two transceivers (e.g., in a MIMO configuration) and step 1030 may comprise communicating with the communication system utilizing four transceivers (e.g., in a MIMO configuration).

The exemplary method 1000 was presented to provide specific examples of generally broader aspects of the present invention. Accordingly, the scope of various aspects of the present invention should not be limited by characteristics of the exemplary method 1000.

Figure 11:
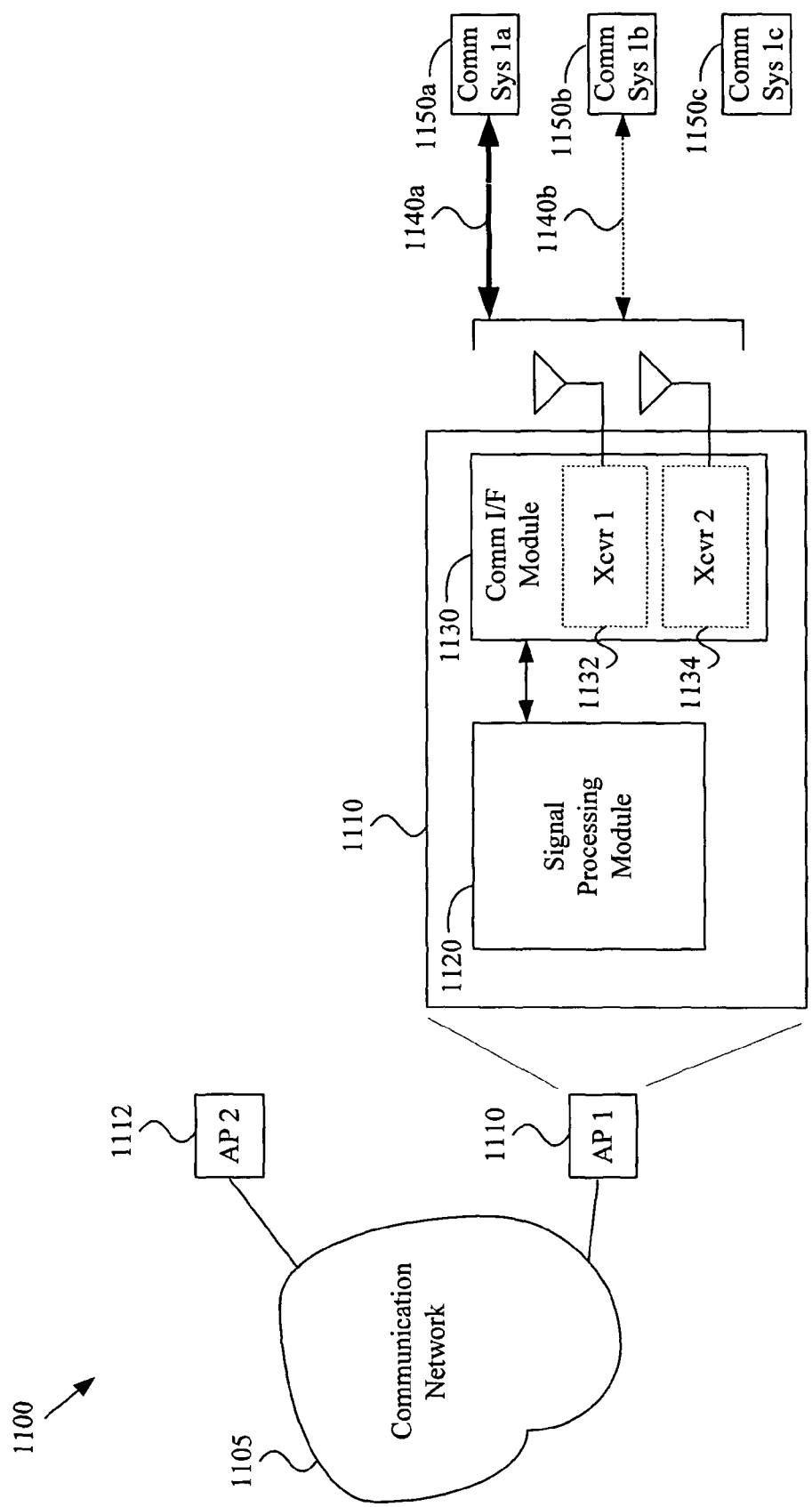
FIG. 11 shows an exemplary communication environment comprising a communication network that performs a communication hand-off, in accordance with various aspects of the present invention.

FIG. 11 shows an exemplary communication environment 1100 comprising a communication network 1105 that performs a communication hand-off, in accordance with various aspects of the present invention. The exemplary communication network 1105 may, for example and without limitation, share various functional characteristics with the exemplary methods 800-1000 shown in FIGS. 8-10 and discussed previously. Also, for example, the exemplary communication network 1105 may share various characteristics with the exemplary MIMO systems illustrated in FIGS. 1-2 and the communication system 710 illustrated in FIG. 7.

The exemplary communication environment 1100 comprises a communication network 1105 and a communication system 1150. The exemplary communication network 1105 comprises a first access point 1110 and a second access point 1112. The first access point 1110 is expanded to illustrate exemplary components thereof.

The first access point 1110 may, for example, comprise a signal processing module 1120 and a communication interface module 1130. The communication interface module 1130 may, in turn, comprise a first transceiver 1132 through an $N^{th}$ transceiver 1134, which may also be referred to herein, in various exemplary scenarios, as the second transceiver 1134. Each of the illustrated transceivers 1132, 1134 is coupled to respective antennas.

The communication network 1105 may comprise characteristics of any of a variety of communication network types.

For example and without limitation, the communication network 1105 may comprise characteristics of a telecommunication network, computer network, television network, satellite or terrestrial communication network, wide area or local area or personal area communication network, wireless or wired or optical communication network, etc. Accordingly, the scope of various aspects of the present invention should not be limited by characteristics of any particular type of communication network.

An access point (e.g., the first access point 1110 and second access point 1112) of the communication network 1105 may comprise characteristics of any of a variety of types of communication network access points. For example and without limitation, an access point may comprise a base transceiver station of a cellular carrier's communication infrastructure. Also for example, and access point may comprise a wired, wireless or optical node of a Local Area Network ("LAN"). Further for example, an access point may comprise a wireless modem of a Personal Area Network ("PAN"). Additionally for example, an access point may comprise a communication satellite. Various characteristics of an access point may depend on characteristics of the communication network to which the access point provides access. Accordingly, the scope of various aspects of the present invention should not be limited by characteristics of any particular type of communication network access point.

As mentioned previously, the exemplary first access point 1110 may comprise a communication interface module 1130 that comprises a plurality of transceivers (e.g., the first transceiver 1132 through $N^{th}$ transceiver 1134). A transceiver may comprise characteristics of any of a variety of transceiver types. For example and without limitation, a transceiver may comprise characteristics of a wired, wireless or optical transceiver. A transceiver may, for example, communicate signals over any of a variety of media and in accordance with any of a variety of communication protocols and standards. Accordingly, though the exemplary transceivers 1132, 1134 are illustrated with corresponding antennas, the scope of various aspects of the present invention should not be limited by any particular type of transceiver.

A transceiver may comprise hardware and/or software components. A plurality of transceivers may be completely independent or may share various hardware and/or software components or modules. Accordingly, the scope of various aspects of the present invention should not be limited by arbitrary boundaries between transceivers. Additionally, various communication functions may be performed by a receiver, and various communication functions may be performed by a transmitter. In general, the following discussion will utilize the term "transceiver" to mean a "receiver and/or transmitter," depending on the context. For example, in a context where a signal is only sent, the term "transceiver" may be interchangeable with the term "transmitter." Accordingly, the scope of various aspects of the present invention should not be limited by arbitrary distinctions between transceivers, transmitters and receivers.

The following discussion will provide exemplary illustrations of a system for performing a communication hand-off. For the sake of illustrative clarity, the examples will generally present various components of the system as resident in an access point of a communication network. Note, however, that various components of the exemplary systems may be distributed across the communication network. For example and without limitation, various aspects of the present invention may be performed in a network access point, a central network controller, or a communication system that is communicatively coupled to the network. Accordingly, the scope of various aspects of the present invention should not be limited by any particular geographical location of various system components.

The exemplary first access point 1110 may, for example, communicate with a communication system utilizing a first number of transceivers of the first access point 1110. For example and without limitation, the first access point 1110 may share various functional characteristics with step 820 of the exemplary method 800 illustrated in FIG. 8 and discussed previously. For example, the first access point 1110 (e.g., the signal processing module 1120) may utilize the first transceiver 1132 (and/or other transceivers) to communicate with the communication system 1150. Such communication is illustrated by communication link 1140a and communication system 1150a.

The first number of transceivers may comprise one or more transceivers of the first access point 1110. The first access point 1110 (e.g., the signal processing module 1120) may, for example, communicate with the communication system 1150 utilizing a single transceiver of the first access point 1150 (e.g., in a SISO or MISO configuration). Also for example, the first access point 1110 may communicate with the communication system 1150 utilizing a plurality of transceivers of the first access point 1150 in a MIMO or MISO configuration (e.g., an order-X MIMO configuration). Further for example, the first access point 1110 may communicate with the communication system 1150 utilizing a plurality of transceivers of the access point in a beam-forming configuration. The scope of various aspects of the present invention should not be limited by a particular first number or manner of utilizing the first number of transceivers to communicate with a communication system.

The first access point 1110 may (e.g., after determining to hand-off the communication system 1150 to another access point) communicate with the communication system 1150 utilizing a second number of transceivers of the first access point 1110 (e.g., where the second number is different from the first number). For example and without limitation, the first access point 1110 may share various functional characteristics with step 830 of the exemplary method 800 illustrated in FIG. 8 and discussed previously. For example, the first access point 1110 (e.g., the signal processing module 1120) may utilize the first transceiver 1132 (and/or other transceivers) to communicate with the communication system 1150. Such communication is illustrated by communication link 1140b and communication system 1150b.

The second number of transceivers may comprise one or more transceivers of the first access point 1110. The second number of transceivers may, for example and without limitation, comprise one or more of the first number of transceivers, discussed previously. In a non-limiting exemplary scenario, the second number of transceivers might be less than the first number of transceivers and might represent a subset of the first number of transceivers.

As with utilizing the first number of transceivers, discussed previously, in utilizing the second number of transceivers, the first access point 1110 may, for example, communicate with the communication system 1150 utilizing a single transceiver of the first access point 1110 (e.g., in a SISO or MISO configuration). Also for example, first access point 1110 may communicate with the communication system 1150 utilizing a plurality of transceivers of the first access point 1110 in a MIMO configuration (e.g., an order-Y MIMO configuration, where Y may or may not be different from X). Further for example, the first access point 1110 may communicate with the communication system 1150 utilizing a plurality of transceivers of the first access point 1110 in a beam-forming configuration. The scope of various aspects of the present invention should not be limited by a particular second number or manner of utilizing the second number of transceivers to communicate with a communication system.

The first access point 1110 may, for example, perform additional processing. Such additional processing may comprise any of a large variety of additional processing. For example and without limitation, the first access point 1110 may communicate with the communication system 1150 utilizing a third number of transceivers or ending communication between the first access point 1110 and the communication system 1150 (e.g., as illustrated by communication system 1150*c* with no communication link). Also for example, the first access point 1110 may perform various processing in support of general communication and communication network maintenance. Further for example, the first access point 1110 may manage handing off or receiving another communication system. Accordingly, the scope of various aspects of the present invention should not be limited by characteristics of any particular additional processing.

In a first non-limiting exemplary scenario (e.g., handing off the communication system 1150 to another access point), the first access point 1110 (e.g., the signal processing module 1120) may initially communicate with the communication system 1150 utilizing a first number of transceivers of the first access point 1110. The first access point 1110 may, for example and without limitation, share various functional characteristics with step 920 of the exemplary method 900 illustrated in FIG. 9 and discussed previously.

Continuing the first non-limiting exemplary scenario, the first access point 1110 may then determine to hand off the communication system 1150 from the first access point 1110 to a second access point (e.g., the second access point 1112). The first access point 1110 may, for example and without limitation, share various characteristics with step 925 of the exemplary method 900 illustrated in FIG. 9 and discussed previously.

For example, the first and second access points 1110, 1112 may both correspond to a single communication network 1105 (as illustrated in FIG. 11) or may correspond to different respective communication networks. In an exemplary scenario, the first and second access points 1110, 1112 may correspond to neighboring base transceiver stations of a cellular network 1105. In an alternative exemplary scenario, the first access point 1110 may correspond to a base transceiver station of a cellular network 1105, and the second access point may correspond to a wireless LAN access point (e.g., a wireless node in an office environment) of another communication network. Accordingly, the scope of various aspects of the present invention should not be limited by whether the first and second access points correspond to the same or different communication networks.

The first access point 1110 (e.g., the signal processing module 1120) may determine to perform a hand-off in any of a variety of manners. For example and without limitation, the first access point 1110 may determine to perform a hand-off in response to a command or request to do so (e.g., from a communication network 1105 controller or the second access point 1112). Also for example, the first access point 1110 may determine to perform a hand-off in response to present communication quality. The first access point 1110 may, for example, determine to perform a hand-off based, at least in part, on communication quality or performance goals. Additionally for example, the first access point 1110 may determine to perform a hand-off based, at least in part, on energy considerations (e.g., amount of available energy or energy-efficiency goals). Still further for example, the first access point 1110 may determine to perform a hand-off based on a comparison of respective measured signal strengths (e.g., as measured at the communication system) for a plurality of access points. Also for example, the first access point 1110 may determine to perform a hand-off based on respective amounts of traffic for a plurality of access points. Accordingly, the scope of various aspects of the present invention should not be limited by characteristics of any particular manner of determining to perform a hand-off.

Continuing the first non-limiting exemplary scenario, the first access point 1110 may (e.g., after determining to hand-off the communication system 1150) communicate with the communication system utilizing a second number of transceivers of the first access point 1110 (e.g., where the second number is different from the first number). The first access point 1110 may, for example and without limitation, share various functional characteristics with step 930 of the exemplary method 900 illustrated in FIG. 9 and discussed previously.

Continuing the first non-limiting exemplary scenario, the first access point 1110 may, for example, end communication between the first access point 1110 and the communication system 1150 (e.g., following a successful hand-off of the communication system 1150).

In an illustrative example, the first access point 1110 may initially communicate with the communication system 1150 utilizing four transceivers in a MIMO configuration, the first access point 1110 may then (e.g., after determining to hand-off the communication system 1150) communicate with the communication system 1150 utilizing one or two transceivers, and then end communication between the first access point 1110 and the communication system 1150 (e.g., after a successful hand-off of the communication system 1150 has been completed).

In a second non-limiting exemplary scenario (e.g., receiving hand-off of the communication system 1150 from another access point), the first access point 1110 may determine to receive a hand-off of the communication system 1150 from a second access point. The first access point 1110 may, for example and without limitation, share various functional characteristics with step 1015 of the exemplary method 1000 illustrated in FIG. 10 and discussed previously.

The first access point 1110 may determine to receive a hand-off in any of a variety of manners. For example and without limitation, the first access point 1110 may determine to receive a hand-off in response to a command or request to do so (e.g., from a communication network 1105 controller or the access point that is handing off the communication system 1150). Also for example, the first access point 1110 may determine to receive a hand-off in response to present communication quality. The first access point 1110 may, for example, determine to receive a hand-off based, at least in part, on communication quality or performance goals. Additionally for example, the first access point 1110 may determine to receive a hand-off based, at least in part, on energy considerations (e.g., amount of available energy or energy-efficiency goals). Still further for example, the first access point 1110 may determine to receive a hand-off based on a comparison of respective measured signal strengths (e.g., as measured at the communication system) for a plurality of access points. Also for example, the first access point 1110 may determine to receive a hand-off based on respective amounts of traffic for a plurality of access points. Accordingly, the scope of various aspects of the present invention should not be limited by characteristics of any particular manner of determining to receive a hand-off.

Continuing the second non-limiting exemplary scenario, the first access point 1110 may (e.g., after determining to receive the communication system 1150 hand-off from a second access point) communicate with the communication system 1150 utilizing a first number of transceivers of the first access point 1110. The first access point 1110 may, for example and without limitation, share various functional characteristics with steps 820 and 1020 of the exemplary methods 800, 1000 illustrated in FIGS. 8 and 10 and discussed previously.

Continuing the second non-limiting exemplary scenario, the first access point 1110 may (e.g., after communicating with the communication system 1150 utilizing a first number of transceivers), communicate with the communication system 1150 utilizing a second number of transceivers of the first access point 1110 (e.g., where the second number is different from the first number). The first access point 1110 may, for example and without limitation, share various functional characteristics with steps 830 and 1030 of the exemplary methods 800, 900 illustrated in FIGS. 8 and 10 and discussed previously.

In one illustrative example, the first access point 1110 may (e.g., after determining to receive hand-off of the communication system 1150) communicate with the communication system 1150 utilizing one transceiver (e.g., in a SISO configuration) or two transceivers (e.g., in a MIMO configuration), and then communicate with the communication system 1150 utilizing four transceivers (e.g., in a MIMO configuration).

The exemplary access point 1110 was presented to provide specific examples of generally broader aspects of the present invention. Accordingly, the scope of various aspects of the present invention should not be limited by characteristics of the exemplary access point 1110.

It should be noted that all of the previously presented exemplary systems and methods were provided to show specific examples of generally broader aspects of the present invention. Accordingly, the scope of various aspects of the present invention should not be limited by characteristics of any particular examples presented herein.

In summary, various aspects of the present invention provide a system and method for utilizing multiple communication pathways for communication hand-off (e.g., involving a MIMO communication system). While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a communication device, a method for performing a communication hand-off, the method comprising:
    communicating with a first access point of a communication network utilizing a first number of transceivers including utilizing a first transceiver and a second transceiver to communicate with the first access point and not with the second access point;
    while communicating with the first access point, determining to perform a hand-off from the first access point to a second access point of a communication network; and
    after determining to perform the hand-off and before completing the hand-off simultaneously communicating with the first access point utilizing a second number of transceivers, the second number different from the first number, and communicating with the second access point utilizing a third number of transceivers, including simultaneously:
        communicating with the first access point and not with the second access point utilizing the first transceiver; and
        communicating with the second access point and not with the first access point utilizing the second transceiver.

2. The method of claim 1, wherein the first access point is an access point of a first communication network, and the second access point is an access point of a second communication network independent of the first communication network and wherein communicating with a first access point of a communication network utilizing a first number of transceivers comprises communicating with the first access point utilizing a plurality of transceivers for MIMO communication with the first access point.

3. The method of claim 2, wherein the first communication network is a telecommunication network and the second communication network is a computer network.

4. The method of claim 1, wherein communicating with the second access point utilizing a third number of transceivers comprises communicating with the second access point utilizing a plurality of transceivers for MIMO communication with the second access point.

5. The method of claim 1, further comprising, after simultaneously communicating with the first access point utilizing the first transceiver and communicating with the second access point utilizing the second transceiver, communicating with the second access point utilizing the first and second transceivers.

6. In a communication device, a method for performing a communication hand-off, the method comprising:
    communicating with a first access point of a communication network utilizing a first number of transceivers, including utilizing a first transceiver to communicate with the first access point and not with the second access point; and
    while communicating with the first access point, determining to perform a hand-off from the first access point to a second access point of a communication network; and
    after determining to perform the hand-off and before completing the hand-off, simultaneously communicating with the first access point utilizing a second number of transceivers, the second number different from the first number, and communicating with the second access point utilizing a third number of transceivers including simultaneously:
        communicating with the first access point, and not with the second access point, utilizing the first transceiver; and
        communicating with the second access point, and not with the first access point, utilizing a second transceiver; and
    after simultaneously communicating with the first access point utilizing the first transceiver and communicating with the second access point utilizing the second transceiver, communicating with the second access point, and not with the first access point, utilizing the first and second transceivers.

7. The method of claim 6, wherein one of the first and second access points is a MIMO access point, and the other of the first and second access points is a non-MIMO access point.

8. The method of claim 6, wherein the first and second access points are MIMO access points.

9. In a communication network, a method for performing a communication hand-off, the method comprising:
communicating with a communication device utilizing a first number of transceivers of a first access point including communicating with the communication device utilizing order-N MIMO communications;
while communicating with the communication device, determining to hand off the communication device from the first access point to a second access point; and
after determining to hand-off the communication device and before completing the hand-off, communicating with the communication device utilizing a second number of transceivers of the first access point including communicating with the communication device utilizing order-M MIMO communications, where M is different from N.

10. The method of claim 9, wherein the second number of transceivers comprises a plurality of transceivers of the access point.

11. The method of claim 9, further comprising, after communicating with the communication device utilizing a second number of transceivers of the first access point, ending communication between the first access point and the communication device.

12. The method of claim 9, wherein the first number is greater than the second number.

13. In a communication device, a system for performing a communication hand-off, the system comprising:
a plurality of transceivers; and
at least one module that operates to utilize a first number of the plurality of transceivers to communicate with a first access point of a communication network by, at least in part, utilizing a first transceiver and a second transceiver to communicate with the first access point and not with a second access point of a communication network;
while communicating with the first access point, determine to perform a hand-off between the first access point and the second access point of the communication network; and
after determining to perform the hand-off and before completing the hand-off, the at least one module operates to simultaneously utilize a second number of the plurality of transceivers, the second number different from the first number, to communicate with the first access point and utilize a third number of the plurality of transceivers to communicate with the second access point by, at least in part, simultaneously:
utilizing the first transceiver to communicate with the first access point and not with the second access point; and
utilizing the second transceiver to communicate with the second access point and not with the first access point.

14. The system of claim 13, wherein the first access point is an access point of a first communication network, and the second access point is an access point of a second communication network independent of the first communication network.

15. The system of claim 14, wherein the first communication network is a telecommunication network and the second communication network is a computer network.

16. The system of claim 13, wherein the at least one module operates to utilize a third number of the plurality of transceivers to communicate with the second access point of the communication network by, at least in part, utilizing the third number of the plurality of transmitters in a MIMO configuration.

17. The system of claim 13, wherein the at least one module, after operating to simultaneously utilize the first transceiver to communicate with the first access point and utilize the second transceiver to communicate with the second access point, operates to utilize the first and second transceivers to communicate with the second access point.

18. In a communication device, a system for performing a communication hand-off, the system comprising:
a plurality of transceivers; and
at least one module that operates to, at least, utilize a first number of the plurality of transceivers to communicate with a first access point of a communication network by, at least in part, utilizing a first transceiver of the plurality of transceivers to communicate with the first access point and not with a the second access point of the communication network;
while communicating with the first access point, determine to perform a hand-off between the first access point and a second access point of a communication network; and
after determining to perform the hand-off and before completing the hand-off, operates to simultaneously utilize a second number of the plurality of transceivers, the second number different from the first number, to communicate with the first access point and utilize a third number of the plurality of transceivers to communicate with a second access point of a communication network by, at least in part, simultaneously:
utilizing the first transceiver to communicate with the first access point and not with the second access point; and
utilizing a second transceiver of the plurality of transceivers to communicate with the second access point and not with the first access point; and
after operating to simultaneously utilize the first transceiver to communicate with the first access point and utilize the second transceiver to communicate with the second access point, operates to utilize the first and second transceivers to communicate with the second access point and not with the first access point.

19. The system of claim 18, wherein one of the first and second access points is a MIMO access point, and the other of the first and second access points is a non-MIMO access point.

20. The method of claim 18, wherein the first and second access points are MIMO access points.

21. In a communication network, a system for performing a communication hand-off, the system comprising:
a first access point comprising a plurality of transceivers; and
at least one module that operates to, at least:
utilize a first number of the plurality of transceivers to communicate with a communication device by, at least in part, utilizing order-X MIMO communications;
while utilizing the first number of the plurality of transceivers to communicate with the communication device, determine to hand off the communication device from the first access point to a second access point; and
after determining to hand off the communication device and before completing the hand-off, utilize a second number of the plurality of transceivers to communicate with the communication device by, at least in part, utilizing order—Y MIMO communications, where Y is different from X.

22. The system of claim 21, wherein the at least one module operates to, after utilizing a second number of the plurality of transceivers to communicate with the communication device, end communication between the first access point and the communication device.

23. The system of claim 21, where the second number of transceivers comprises a plurality of transceivers of the access point.

24. The system of claim 21, wherein the first number is greater than the second number.

* * * * *